United States Patent [19]

Thomas

[11] Patent Number: 5,316,385
[45] Date of Patent: May 31, 1994

[54] CORRECTION-FREE PYROMETRY IN RADIANT WALL FURNACES

[75] Inventor: Andrew S. W. Thomas, Webster, Tex.

[73] Assignee: The United States of America as represented by the Administrator of the National Aeronautics and Space Administration, Washington, D.C.

[21] Appl. No.: 44,449

[22] Filed: Mar. 30, 1993

[51] Int. Cl.$^5$ ................................................ G01J 5/08
[52] U.S. Cl. ...................................... 374/130; 374/121; 250/340; 250/338.1; 356/43
[58] Field of Search ............... 374/141, 130, 121, 6, 374/129, 132; 33/293; 250/352, 340, 342, 338.1; 356/43

[56] References Cited

U.S. PATENT DOCUMENTS

| | | | |
|---|---|---|---|
| 2,984,747 | 5/1961 | Walker | 374/130 |
| 3,482,448 | 12/1969 | Gaffard | 374/121 |
| 3,751,664 | 8/1973 | Falbel | 374/130 |
| 4,144,758 | 3/1979 | Roney | 374/129 |
| 4,290,182 | 9/1981 | Lawrence | 250/340 |
| 4,315,150 | 2/1982 | Darringer et al. | 374/130 |
| 4,435,092 | 3/1984 | Iuchi | 374/129 |
| 4,507,551 | 3/1985 | Howard et al. | 250/352 |
| 4,533,243 | 8/1985 | Zhukov et al. | 374/139 |
| 4,558,222 | 12/1985 | Neil | 250/352 |
| 4,611,930 | 9/1986 | Stein | 374/121 |
| 4,636,091 | 1/1987 | Pompei et al. | 250/342 |
| 4,648,711 | 3/1987 | Zachary | 374/130 |
| 4,799,788 | 1/1989 | Berthet et al. | 374/121 |
| 4,818,102 | 4/1989 | Glenn | 374/121 |
| 4,986,672 | 1/1991 | Beynon | 374/130 |
| 5,000,580 | 3/1991 | Leininger et al. | 374/130 |
| 5,021,657 | 6/1991 | Kettlewell et al. | 250/352 |
| 5,127,742 | 7/1992 | Fraden | 374/130 |

FOREIGN PATENT DOCUMENTS

| | | | |
|---|---|---|---|
| 0806280 | 2/1969 | Canada | 250/340 |
| 1573376 | 8/1970 | Fed. Rep. of Germany | 374/130 |
| 0002700 | 1/1979 | Japan | 250/340 |
| 0024686 | 2/1979 | Japan | 250/352 |
| 0063469 | 12/1980 | Japan | 374/129 |
| 0167930 | 10/1983 | Japan | 374/129 |
| 0171643 | 10/1983 | Japan | 374/129 |
| 0082122 | 3/1990 | Japan | 250/352 |
| 0696604 | 9/1953 | United Kingdom | 374/130 |

*Primary Examiner*—Diego F. F. Gutierrez
*Attorney, Agent, or Firm*—John H. Kusmiss; Thomas H. Jones; Guy M. Miller

[57] ABSTRACT

A method and apparatus to produce correction-free pyrometry is described. The method determines the optimum position for a pyrometer that "views" a specular, spherical or near-spherical target in a furnace through pyrometer optics and a window in a wall of the furnace. The positioning method uses nonparaxial optical analysis to determine the position of an image of the window in the target. The window image is free of any image of the furnace walls, that is, it is free from wall radiance, and pure target radiance can be obtained in that region. The optical analysis is then used to back project the pyrometer detector through the pyrometer optics and onto the surface of the target. If the detector projection falls completely within the image of the window, the detector will read only pure target radiance and no correction will be necessary to obtain the temperature of the target through pyrometry.

12 Claims, 6 Drawing Sheets

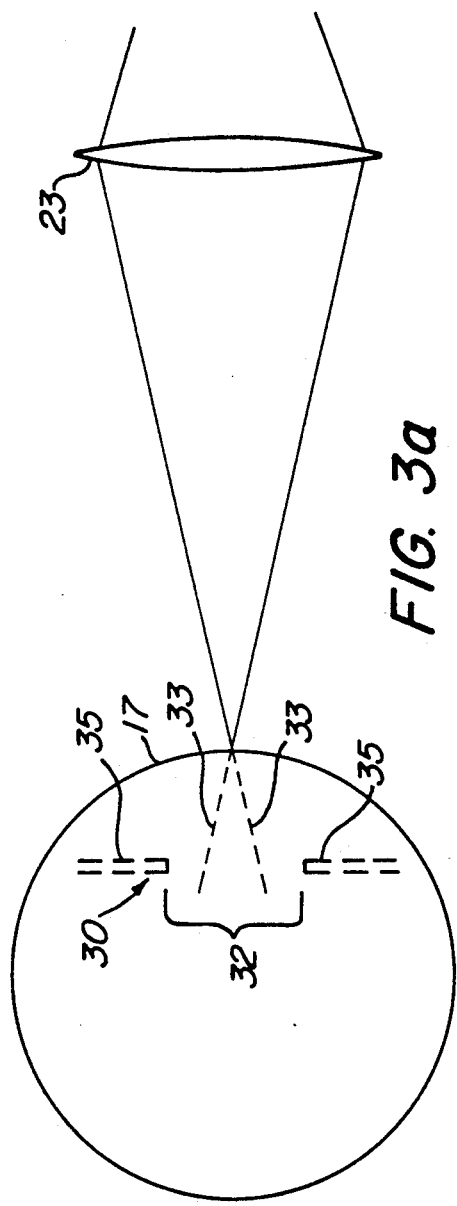
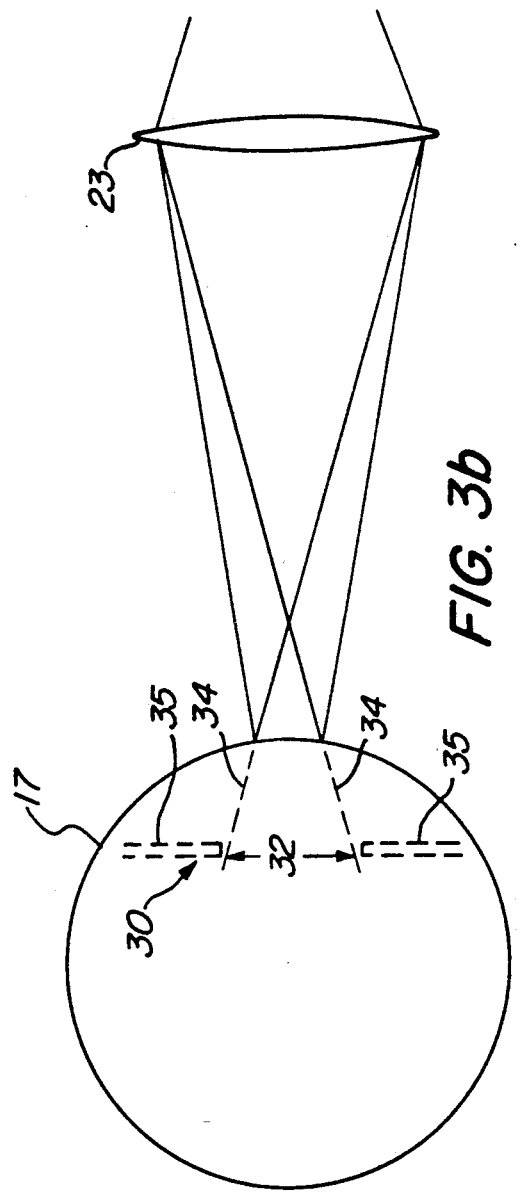
FIG. 3a
FIG. 3b

CORRECTION-FREE PYROMETRY IN RADIANT WALL FURNACES

ORIGIN OF THE INVENTION

The invention described herein was made in the performance of work under a NASA contract, and is subject to the provisions of Public Law 96-517 (35 U.S.C. Section 202) in which the Contractor has elected not to retain title.

TECHNICAL FIELD

The subject invention relates to temperature measurement and, more particularly, to a pyrometer and furnace design construction which enables accurate noncontact measurement of temperature of a test material free from effects of background radiation. The invention is particularly applicable in microgravity applications.

BACKGROUND ART

The science of containerless processing of materials under the microgravity conditions of orbital space flight has raised the need for specialized instrumentation. This includes noncontact positioning and furnace systems, remote sample handling techniques, and noninvasive diagnostic instrumentation. Of the latter, the remote measurement of specimen temperatures is recognized as being particularly important.

In a typical containerless processing application, a specimen is positioned inside a hypothetical furnace. Acoustic or electromagnetic forces are used to maintain this position. The specimen itself is invariably spherical, possibly molten, and may be a metal or glass, but in any case, it generally has a highly specular surface. The furnace may have walls which are heated so as to radiantly heat the specimen. Alternatively, the specimen may be heated by some external source such as a laser and, at high temperatures, its own incandescence will illuminate the inside of the furnace. In either case the amount of background radiance in the furnace will be significant.

Thermocouples are clearly unsuitable for measuring the temperature of the specimen in such cases, and radiometric pyrometry is a logical choice. By measuring the radiance, $R$, of the target, and if its emissivity, $\epsilon$, is known, then the temperature may be determined from the Planck radiation law, $$R = \frac{\epsilon C_1}{\lambda^5 \exp(C_2/\lambda T - 1)} \quad (1)$$

where $C_1$ and $C_2$ are the first and second radiation constants and $\lambda$ is the wavelength of the measurement. This is a well-documented and useful technique and the exponential relationship enables good resolution to be achieved.

However, there are some specialized considerations for containerless processing that need to be addressed in order to obtain true temperatures from radiance measurements. Not the least of these is the problem of the background radiance which can contribute to the measured radiance levels resulting in an error in the inferred temperature. Indeed, if a metal is to be melted in a heated-wall furnace, the effective emissivity of the closed furnace cavity may be so large that the walls contribute more radiant energy than the specimen itself. For example, if the furnace acts like a blackbody but the specimen emissivity is only 0.3, for example, then the furnace will generate about three times the radiant energy intensity of the target. Since the target is specular, this energy may be reflected into the pyrometer. From Equation (1), it is easy to show that at 1000° C., for example, the error in the inferred temperature will be about 200° C. for measurements at 650 nm, a wavelength typical of many pyrometers. It will be difficult to implement corrections of this magnitude that preserve the accuracy and confidence needed in the measurement.

STATEMENT OF THE INVENTION

It is therefore an object of the invention to provide an improved temperature measurement technique for terrestrial and microgravity conditions wherein the target is suspended or levitated within a furnace by accoustic, electromagnetic or electrostatic forces;

It is another object of the invention to achieve accurate pyrometric temperature measurement of specular target temperature; and It is yet another object of the invention to provide a method and apparatus for pyrometrically determining the temperature of any spherical or near-spherical specular target suspended in a furnace and viewed through a window in the wall of the furnace.

The invention exploits the fact that the target is specular so that only reflections from certain angles will be possible. Under such circumstances, a pyrometer is positioned so that it sees only the image of the viewing window on the target, or at least a portion of that image. Since this image is free of any furnace wall image, it is free from wall radiance, and correction-free target radiance is obtained. A method for locating the pyrometer with respect to a window is disclosed which employs the steps of determining the location of the image of the window in the target and then locating the pyrometer such that the projection of the pyrometer optics lies within the window image so determined. An important feature is that the pyrometer location is determined through a nonparaxial optical analysis employing differential optical ray-tracing methods to derive a series of exact relations for the image location.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 3a and FIG. 3b illustrate the cases where the projection of the pyrometer optics lies within the window image, determined by paraxial analysis;

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art.

Figure 1:
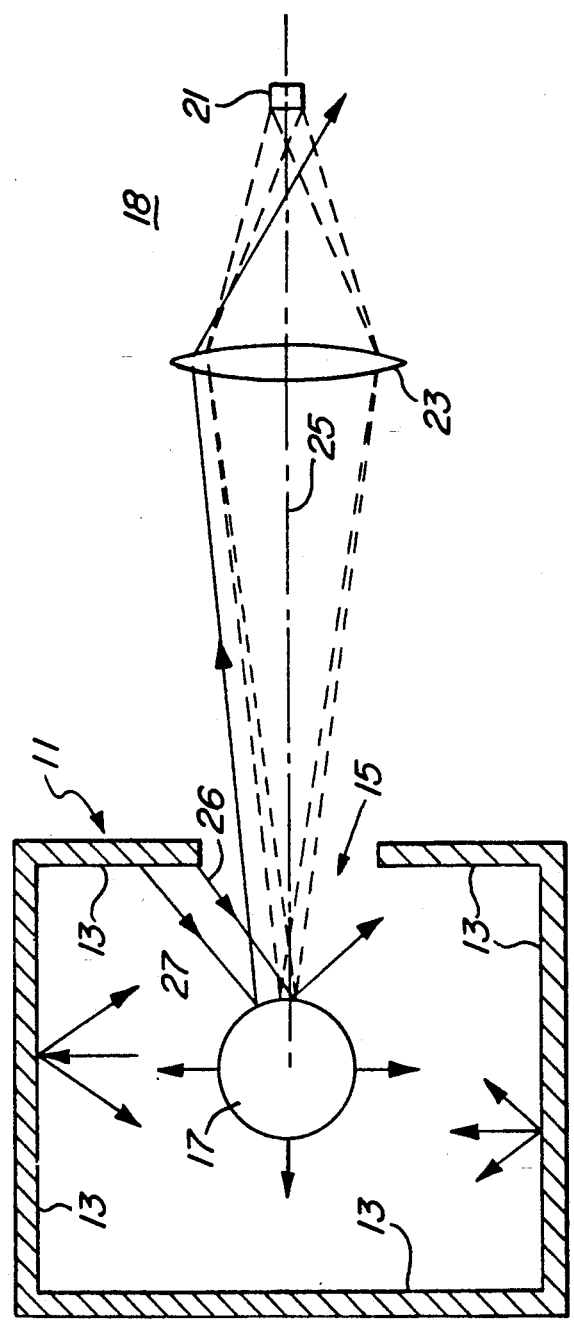
FIG. 1 is a schematic diagram of the preferred embodiment.

FIG. 1 shows a furnace 11 having inner walls 13 and a viewing window 15. Window 15 is typically circular.

Located within the furnace 11 is a specular, spherical target 17. A pyrometer 18 located outside the furnace 11 includes a detector 21 and optics 23. The pyrometer 18 "views" the target 17 through pyrometer optics 23 and window 15.

The pyrometer 18 is so positioned that its detector 21 sees only the image of the viewing window 15 on the target 17. Since this image is free of any image of the furnace walls 13, it is free from wall radiance, and correction-free target radiance is obtained.

The geometry of FIG. 1 illustrates how this is achieved. Although the target is bathed in wall radiance, for specularly-reflected radiance to enter the pyrometer 18, it must originate at or near the viewing axis 25 of the pyrometer 18. But because of the presence of the open viewing window, no source of wall radiance exists at or near the viewing axis 25.

Two examples are shown by the solid lines, rays 26, 27, in FIG. 1. As may be seen, even a ray 26, which originates from the rim of the window 15 and strikes the target somewhere directly in the measurement region, will not be scattered back along the line of sight, but in some off-axis direction. If this off-axis direction is at an angle greater than the collection angle of the pyrometer 18, it will not contribute to the measurements. The consequence is that an observer viewing along the pyrometer axis 25 will see a dark region on the face of the target 17 because there is no source of reflected wall radiance issuing along the viewing axis 25. In effect, the observer is seeing the image of the cold window 15 on the target.

A key feature of the concept being examined is that all reflections from the target 17 are specular and are possible only at certain restricted angles. Proper design can ensure that such reflections will not reach the pyrometer detector element 21. Therefore, any analysis must also include the pyrometer optics 23. In order to understand the optical constraints that this implies, the inventor has found that the simplest approach is to examine how the pyrometer detector 21 is imaged onto the target 17 in relation to the corresponding image of the furnace walls 13 and window 15. The ensuing analysis will employ this approach according to conventional paraxial optics to demonstrate the inadequacies of that approach, and thereafter develop a valid nonparaxial approach to determine the wall and window image in the target.

Paraxial Optics

Figure 2:
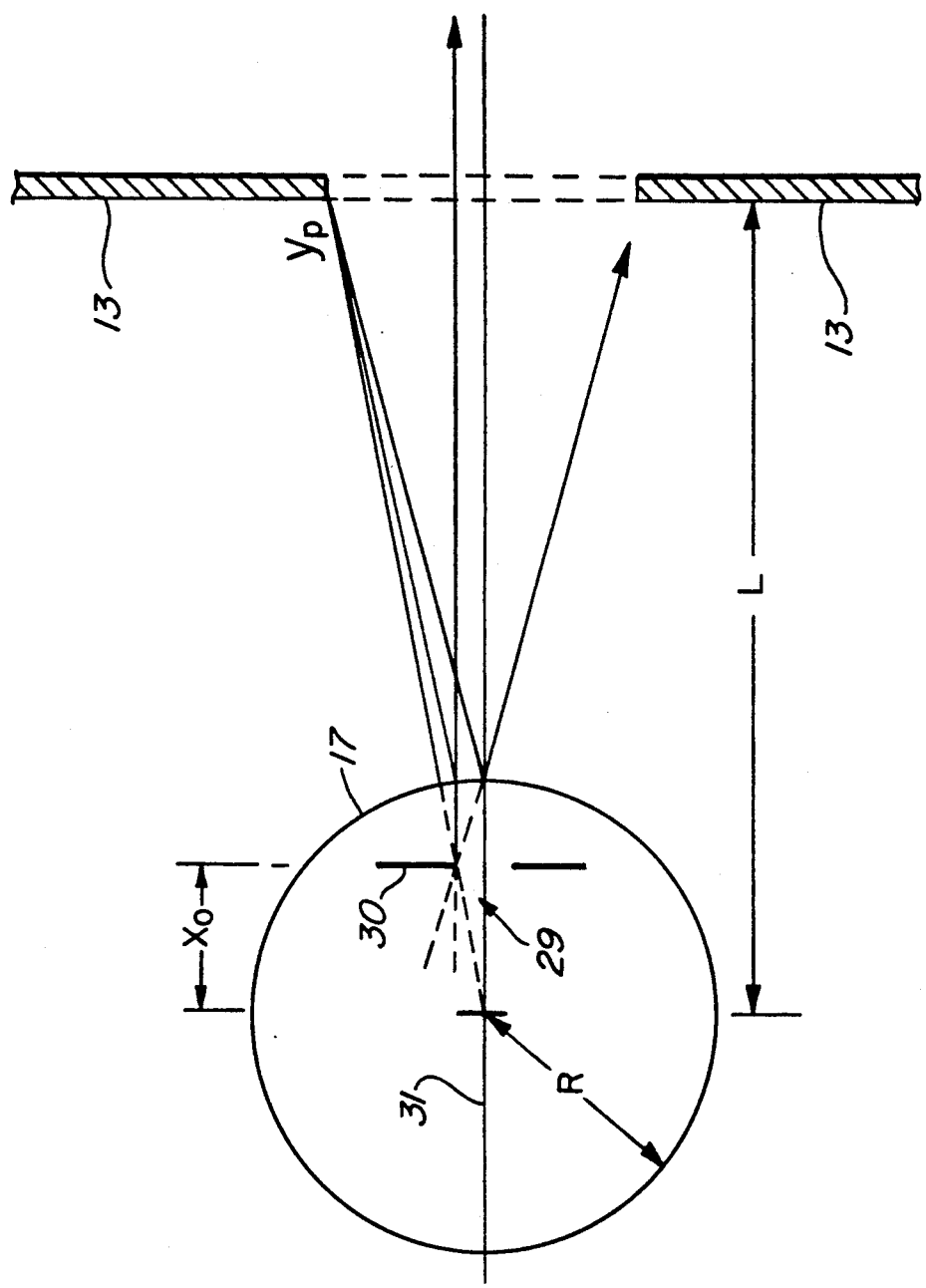
FIG. 2 is an optical ray tracing diagram of a furnace window image according to conventional paraxial optical analysis.

Considering firstly the image of the walls 13, the optical ray tracing principles that are used to define an image in a spherical mirror target 17 are depicted in FIG. 2. Standard paraxial optical theory places the focal point 29 of such a mirror at the half-radius position from which the image plane 30 can be located using the construction shown in the FIGURE. That is, the image plane at $x = x_0$ is found by tracing rays from some point, $y_p$, on the wall to the surface of the target sphere 17 along a radial line and along a line to the equator 31 of the sphere 17. The point of intersection of the back-projected rays locates the image plane 30 as shown. Equivalently, it may be found from standard mirror relationships that relate the distance of the surface of the sphere 17 to the wall 13, $L - R$, to the distance of the sphere surface to the image plane, $R - x_0$, as $$\frac{-1}{R - x_0} + \frac{1}{L - R} = \frac{-2}{R},$$

from which one obtains:

$$X_o/R = L/(2L - R) \qquad (2)$$

It should be noted that the foregoing analysis assumes paraxial rays, that is, rays whose angles relative to the line of sight are all small. This leads to an image of the plane 30 that is also planar, that is, $x_o$ is independent of $y_p$. Thus, a point on the window perimeter at $y = y_p$ is imaged within the sphere at $(x_i, y_i)$, where $$X_i = X_o \text{ and } y_i = y_p X_o/L. \qquad (3)$$

Next, having determined the location of the image of the furnace walls and the window in the target, the image of the pyrometer detector 21 at the same location must be determined. This is shown for a hypothetical pyrometer with zero spot size in FIG. 3(a) and for a real pyrometer with finite spot size in FIG. 3(b). In both cases, the spatial extent of the projection of the pyrometer optics 23 back to the image plane, relative to the size of the image of the window 32, determines whether or not correction-free pyrometry can be achieved. If these projections (shown as the dashed lines 33, 34 in the figure) at the image plane 30 are smaller than the window image 32 (as is the case depicted in the figures), then the measurements will be error-free and will indicate true target radiance. If these projections 33, 34 overlap the images of the radiant walls 35, however, then some of the wall radiance will strike the pyrometer detector 21 and the measurements will be in error.

Thus, knowledge of the detector effective spot size, the collection optics f-number, and Equations (2) and (3) provide ready guidelines for designing the geometry of such systems to avoid the need for corrections to radiance measurements. The approach also determines how much lateral position offset of the pyrometer 18 can be tolerated. It also defines how much movement of the sample can be tolerated before radiance errors will arise, a consideration that is important in microgravity positioning systems. It should be noted that the spatial extent of the region over which error-free data can be acquired is smaller than the apparent window image, primarily because of the finite spot size of the pyrometer 18. But it is also of interest to note that even with a point pyrometer, i.e., zero spot size, there could be some geometries when radiance errors will occur even if there is a clearly-defined and finite window image.

However, there is a shortcoming to the analysis that has been presented, which is a consequence of the paraxial assumption that all ray angles are small. While that may be true for the pyrometer collection optics, it will only be the case for the reflection ray paths if the windows are very small and far from the target. For a micro-gravity application where size, weight, and optical access are important, that assumption will not be valid. In such cases the planar wall 13 will be close to the target and will not be imaged as a plane, but will be imaged as a curved surface, and Equations (2) and (3) will not be valid. Correct design of a measurement system must take account of this effect.

Nonparaxial Analysis

Figure 4:
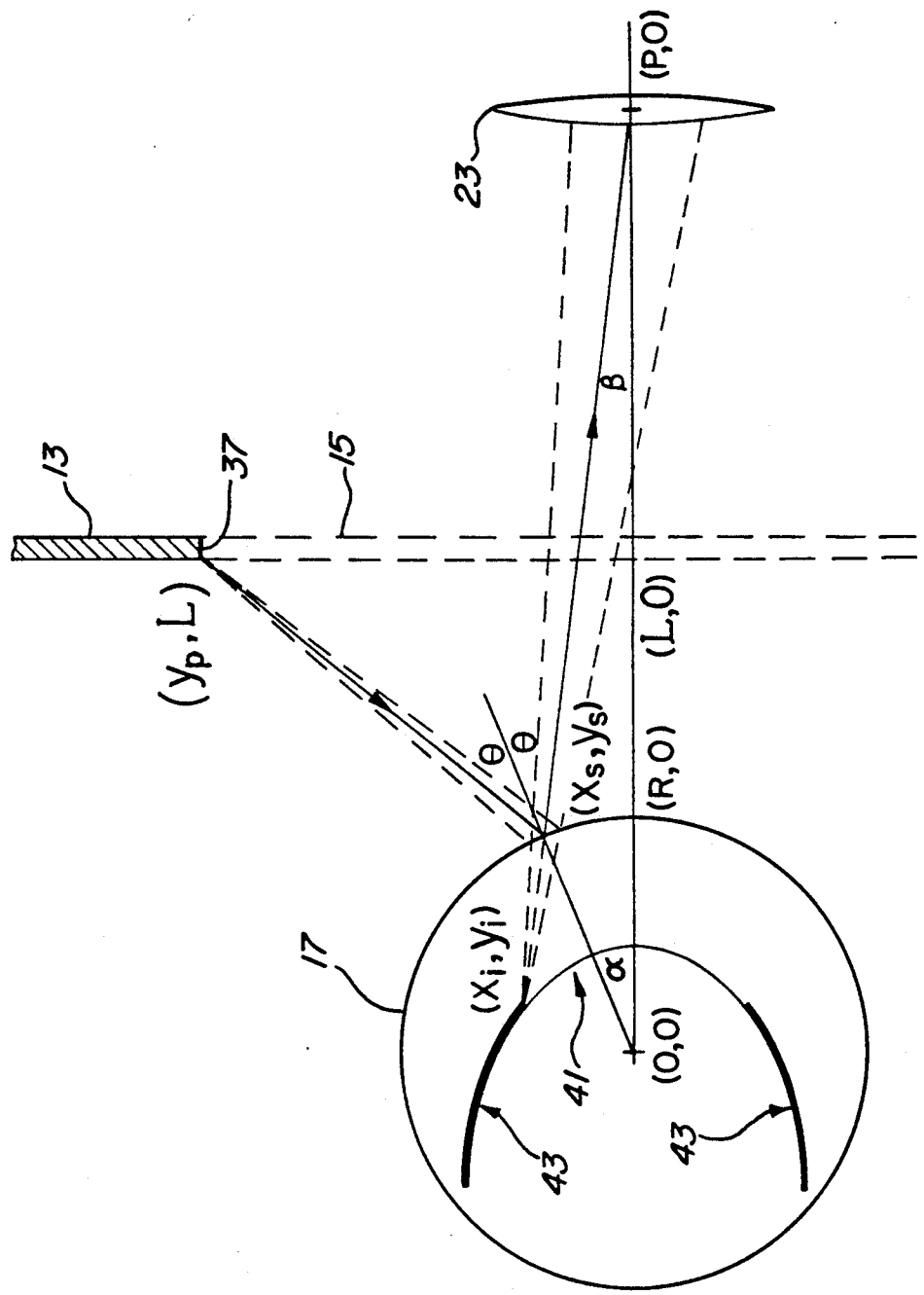
FIG. 4 is an optical ray tracing diagram illustrating a furnace window image according to the nonparaxial analysis of the preferred embodiment.

The optical construction for this more realistic configuration is shown in FIG. 4, in which the viewing port 15 is now quite large and close to the target 17 and the ray angles $\Theta$ are no longer small. The wall 13 is again located on a plane at a distance L from the center of the sphere 17 of radius R, and the pyrometer entrance optics 23 is at $x=P$. A source of wall radiance originating at the rim 37 of the window 15 at $(y_p, L)$ strikes the surface of the sphere 17 at the point $(x_s, y_s)$ and is specularly reflected into the pyrometer 18 through optics 23. Back projection of this ray and its intersection with other nearby rays (shown as the dashed lines) defines the image of the source point at $(x_i, y_i)$. The resultant window image 41 and furnace wall image 43 (thick black lines) are curved.

The problem for analysis presented by FIG. 4 is one of determining the functional relationship of $(x_i, y_i)$ in terms of $y_p$, L, P, and R. Commercial ray tracing programs could be used, but these can be tedious if many configurations are being examined. An approach based on analytical relationships is more useful. The problem has some similarities to the rendering problem in computer graphics in which a surface is rendered, pixel by pixel, onto a spherical mirror surface. The difference lies in the fact that the viewing, in this case, is through an opening 15 in the plane that is being rendered.

Figure 5:
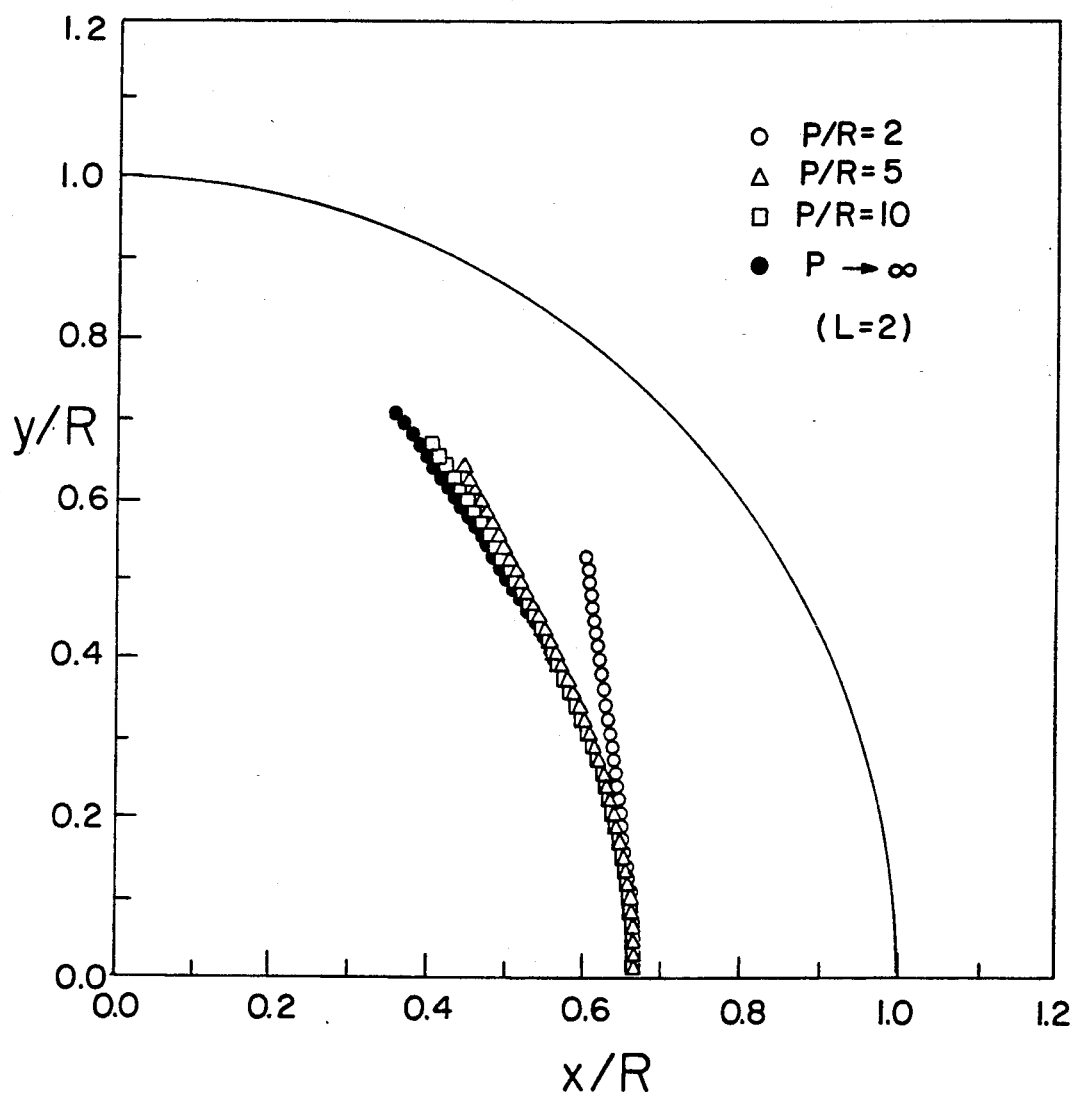
FIGS. 5 and 6 are graphs useful in illustrating the image location analysis according to the preferred embodiment.

To develop a suitable relationship it is first necessary to find the relationship between $x_s$, $y_s$, and $y_p$. The geometry in FIG. 5 gives rise to the following:

$$\tan(2\theta - \beta) = \frac{y_p - y_s}{L - x_s} \tag{4}$$

$$\tan(\theta - \beta) = \tan \alpha = \frac{y_s}{x_s} \tag{5}$$

$$\tan \beta = \frac{y_s}{P - x_s} \tag{6}$$

Combining Equations (4) and (5) and using trigonometric relationships gives:

$$\frac{y_p - y_s}{L - x_s} = \frac{\tan \theta + \tan(\theta - \beta)}{1 - \tan \theta \tan(\theta - \beta)} = \frac{x_s \tan \theta + y_s}{x_s - y_s \tan \theta}$$

from which one obtains:

$$\tan \theta = \frac{y_p x_s - y_s L}{L x_s + y_p y_s - R^2} \tag{7}$$

Similarly, by combining Equations (5) and (6) in the same way leads to another expression for $\tan \Theta$ as:

$$\tan \theta = \frac{-y_s P}{R^2 - P x_s} \tag{8}$$

In both cases use is made of the equation for a circle that relates $x_s$ and $y_s$, namely, $x_s^2 + y_s^2 = R^2$. Equating Equations (7) and (8) gives, after some reduction, the following biquadratic equation:

$$y_s^2 - \frac{y_s}{y_p} R^2 \left( \frac{P+L}{P} \right) + 2 x_s y_s \frac{L}{y_p} + x_s \frac{R^2}{P} - x_s^2 = 0 \tag{9}$$

This defines the location where a ray that ultimately ends up entering the pyrometer first strikes the sphere and is reflected. One can substitute the equation for the circle to obtain a quartic equation for either $x_s$ or $y_s$. There are four roots to such an equation, two that are imaginary and two that are real. One of the real roots is the actual ray path, while the other corresponds to the case where the ray is reflected from the inside back surface of the sphere, a case that the formulation allows, but which is not real, at least for solid targets. Unfortunately, it is quite difficult to obtain all these roots in closed form, but the reverse problem of finding $y_p$ given $x_s$ or $y_s$, is very straightforward and can be found from inverting Equation (9) as:

$$y_p = \frac{y_s R^2 (1 + L/P) - 2 x_s y_s L}{y_s^2 - x_s^2 + x_s R^2/P} \tag{10}$$

Now, the image point $(x_i, y_i)$ is that point where the family of rays that originate at this common point $y_p$ strike the surface at different points and all enter the pyrometer, but whose back projections into the sphere also intersect at a common point. This is shown in FIG. 4, and the equation for any such reflected ray is:

$$y = y_s - (x - x_s) \tan \beta$$

The image point on this line is therefore that point which does not change as $x_s$ or $y_s$ is varied for a fixed $y_p$, and can be conveniently found as the point where the derivative of y with respect to $x_s$ (or $y_s$) is zero. Noting that for the surface of the sphere, $\delta y_s/\delta x_s = -x_s/y_s$, this procedure gives the following result:

$$x_s - x = \frac{R^2}{y_s(x_s + y_s \tan \theta)} \cdot \frac{1}{\partial \tan \beta / \partial x_s} \tag{11}$$

The derivative in this equation can be obtained from Equation (6), but that will give rise to derivatives of P. A more useful result can be found by noting that, $\tan \Theta = \tan(\Theta - \alpha)$ which, combined with Equation (5), yields the following:

$$\tan \beta = \frac{x_s \tan \theta - y_s}{x_s + y_s \tan \theta}$$

Differentiating this result leads, after reduction, to:

$$\frac{\partial \tan \beta}{\partial x_s} = \frac{(R^2 + R^2 \tan^2 \theta + y_s R^2 \, \partial \tan \theta / \partial x_s)}{y_s (x_s + y_s \tan \theta)^2} \tag{12}$$

and the derivative of $\Theta$ can similarly be found by differentiating Equation (7), leading to the result:

$$\frac{\partial \tan \theta}{\partial x_s} = \frac{\tan \theta}{y_s} \left( \tan \theta - \frac{y_p y_s + L x_s}{y_s L - y_p x_s} \right) \tag{13}$$

When Equation (12) is substituted into Equation (11), this gives the equation for the x-coordinate of the image point as:

$$x = x_i = x_s - \frac{(x_s + y_s \tan\theta)}{(1 + \tan^2\theta + y_s \partial\tan\theta/\partial x_s)} \quad (14)$$

Thus, given some point $(X_s, y_s)$ on the sphere, as well as the pyrometer location, image locations can now be determined by first finding the appropriate radiance source point $y_p$ that will irradiate the sphere at this point and also provide reflections into the pyrometer 18. Then Equations (13) and (14) can be used to find the image point that corresponds to that value of $y_p$. It is worth noting that these solutions are exact, and no approximating assumptions have been made in their derivation.

Figure 6:
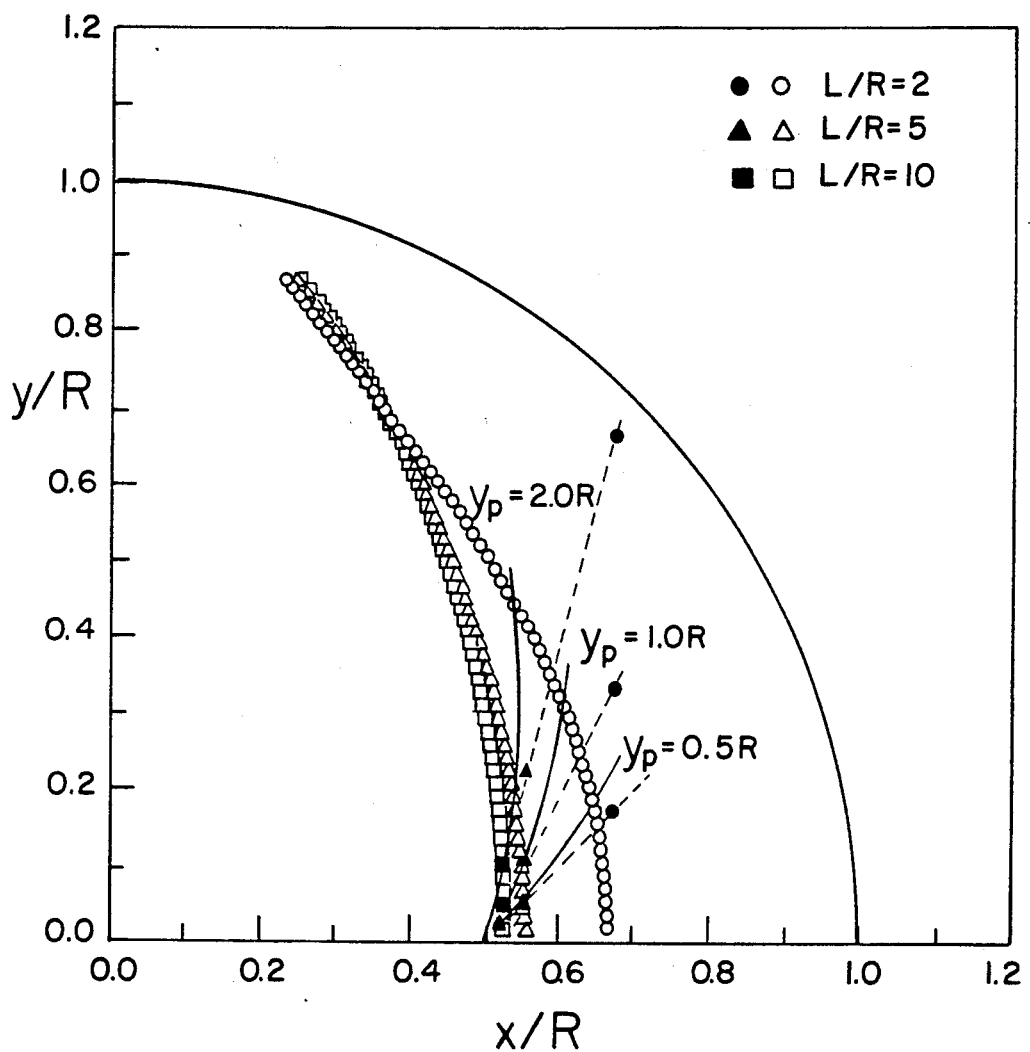

Some typical results from these kinds of computations are shown in FIGS. 5 and 6. FIG. 5 corresponds to the case where the distance L is arbitrarily fixed at 2R, i.e., where the face of the target 17 is one radius from the wall 13, and where the pyrometer 18 is moved to different distances from the target 17. This geometry is realistic for the microgravity application. It is apparent that the image 43 of the planar wall 13 is curved, an observation that is to be expected based on common experience. Also, the image position quickly becomes insensitive to the position of pyrometer 18, once this is larger than about ten target radii, and this, too, is probably representative of most real applications.

FIG. 6 shows three cases in which the target-to-wall spacing is varied, but where P is maintained very large ($P \rightarrow \infty$). As the wall 13 is moved away from the target 17, its image recedes into the sphere and approaches the half-radius position. The points where each of these image surfaces crosses the x-axis correspond to the image plane location determined from paraxial relationships, Equation (2), a result that is to be expected. To illustrate how the size of the image of a given window changes as it is moved away from the target, lines of constant $y_p$ have been added to the Figure. The paraxial values are shown as dashed lines, while the nonparaxial results are shown as solid lines. These enable the results to be used to make design estimates. Close to the axis, all the sets converge in toward the half-radius focus point, but further from the axis the paraxial and nonparaxial results diverge dramatically. In fact, while the paraxial results are straight lines radiating away from the focus point, the nonparaxial lines curve steeply back into the sphere.

The findings confirm the observation that the use of the paraxial computations can lead to significant errors in the estimate of the size of the image. For example, a window that is 2.0 sphere radii in radius ($y_p=2.0R$), and located 2.0 radii from the sphere center (L/R=2.0) will be imaged with a diameter of about 0.4 radii. The corresponding paraxial result suggests 0.67 radii.

A final observation that can be made from FIGS. 5 and 6 is that although the planar wall may be infinite in extent, its image is finite, and the image surfaces do not continue back into the sphere indefinitely. This is because no rays can strike the surface of the sphere at angles greater than some maximum and still be reflected back into the pyrometer. Thus, there is an upper limit to any window-image size, so there will be cases in the pyrometric application where increasing the size of the window will not give a proportionate increase in the area over which correction-free measurements may be made.

The preceding analysis of a radiant wall imaged onto a spherical surface shows how to determine the size of the image of a window 15. One then sizes the pyrometer optics, in accordance with FIGS. 3a, 5, and 6, to make error-free radiance measurements.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. A pyrometric system comprising:
    a furnace having interior walls and a window in one of said walls;
    a target to be heated located within said furnace and having a specular surface;
    a pyrometer located opposite said window for measuring the temperature of said target and having a pyrometer detector and associated pyrometer optics;
    analysis means for using nonparaxial optical analysis to determine the location of an image of said window in said target; and
    locating means for locating said pyrometer such that a back projection of the pyrometer detector through the pyrometer optics and onto the image of said window lies within the image of said window.

2. The system of claim 1, wherein said furnace is rectangular in cross-section.

3. The system of claim 2, wherein said target is near-spherical.

4. The system of claim 2, wherein said target is spherical.

5. The system of claim 4, wherein said target is suspended within said furnace under terrestrial conditions by external forces.

6. The system of claim 4, wherein said target is suspended within said furnace by levitation under microgravity.

7. The system of claim 4, wherein said window is circular.

8. A method of locating a pyrometer, comprising a pyrometer detector and associated pyrometer optics, with respect to a window in a wall of a furnace for heating a specular surfaces target suspended therein, comprising the steps of:
    using nonparaxial optical analysis to determine the location of an image of the window in the target; and
    locating the pyrometer such that a back projection of the pyrometer detector through the pyrometer optics and onto the image of the window lies within the image of the window.

9. The method of claim 8, wherein said target is spherical.

10. The method of claim 9, wherein said step of optical analysis employs the mathematical relation:

$$y_p = \frac{y_s R^2 (1 + L/P) - 2x_s y_s L}{y_s^2 - x_s^2 + x_s R^2/P}$$

where R is a radius of the target, L is a distance from a center of the target to the wall, P is a distance from the center of the target to an entrance to the pyrometer optics, ($y_p$, L) represents coordinates of a source of wall radiance originating at a rim of the window, and ($x_s$, $y_s$) represents coordinates of a point on a surface of the target struck by wall radiance from the source at ($y_p$, L).

11. The method of claim 10, wherein said step of optical analysis employs the mathematical relation:

$$x = x_i = x_s - \frac{(x_s + y_s \tan\theta)}{(1 + \tan^2\theta + y_s \partial \tan\theta / \partial x_s)}$$

where an image point ($x_i$, $y_i$) is a point where rays of wall radiance from the source at ($y_p$, L) strike the target and enter the pyrometer optics, but whose back projections onto the target also intersect at a common point, and x is an x-coordinate of the common point.

12. The method of claim 8, wherein said target is near-spherical.

* * * * *